United States Patent
Sih et al.

(10) Patent No.: US 6,665,539 B2
(45) Date of Patent: Dec. 16, 2003

(54) POSITION LOCATION WITH LOW TOLERANCE OSCILLATOR

(75) Inventors: Gilbert C. Sih, San Diego, CA (US); Qiuzhen Zou, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 313 days.

(21) Appl. No.: 09/775,895

(22) Filed: Feb. 1, 2001

(65) Prior Publication Data

US 2001/0005680 A1 Jun. 28, 2001

Related U.S. Application Data

(63) Continuation-in-part of application No. 09/150,093, filed on Sep. 9, 1998, now Pat. No. 6,208,292.

(51) Int. Cl.[7] .................................................. H04Q 7/20
(52) U.S. Cl. ............................... 455/456.3; 455/456.1; 455/85; 455/86
(58) Field of Search ..................... 455/76, 456, 457, 455/85, 86; 342/357.12, 357.1

(56) References Cited

U.S. PATENT DOCUMENTS 6,208,292 B1 * 3/2001 Sih et al. ............... 342/357.12

FOREIGN PATENT DOCUMENTS

| EP | 0933962 | 8/1999 | ............ H04Q/7/38 |
| WO | 9733382 | 9/1997 | ............ H04B/7/185 |
| WO | 9825158 | 6/1998 | ............ G01S/5/14 |
| WO | 0010028 | 2/2000 | ............ G01S/5/00 |
| WO | 0014562 | 3/2000 | ............ G01S/5/00 |

* cited by examiner

*Primary Examiner*—Edward F. Urban
*Assistant Examiner*—Lana Le
(74) *Attorney, Agent, or Firm*—Philip Wadsworth; Charles Brown; Don Kordich

(57) ABSTRACT

The present invention is a novel and improved method and apparatus for performing position location in wireless communications system. One embodiment of the invention comprises a method of performing position location in a wireless subscriber unit having a local oscillator, including the steps of receiving a position location request, acquiring a timing signal when a sufficient period of time has elapsed since the local oscillator has been corrected and correcting the local oscillator using a correction signal based on the timing signal, substantially freezing the correction signal, performing a position location procedure using the local oscillator with the correction signal applied, and ending said position location procedure.

4 Claims, 12 Drawing Sheets

POSITION LOCATION WITH LOW TOLERANCE OSCILLATOR

This application is a continuation-in-part of 09/150,093 filed Sep. 9, 1998 now U.S. Pat. No. 6,208,292.

BACKGROUND OF THE INVENTION

I. Field of the Invention

The present invention relates to position location. More particularly, the present invention relates to a novel and improved method and apparatus for performing position location in wireless communications system.

II. Description of the Related Art

Both government regulation and consumer demand have driven the demand for position location functionality in cellular telephones. The global positioning system (GPS) is currently available for performing position location using a GPS receiver in conjunction with a set of earth orbiting satellites. It is therefore desirable to introduce GPS functionality into a cellular telephone.

Cellular telephones, however, are extremely sensitive to cost, weight and power consumption considerations. Thus, simply adding additional circuitry for performing GPS location is an unsatisfactory solution for providing position location functionality in a cellular telephone. Thus, the present invention is directed to providing GPS functionality in a cellular telephone system with a minimum of additional hardware, cost and power consumption.

SUMMARY OF THE INVENTION

The present invention is a novel and improved method and apparatus for performing position location in wireless communications system. One embodiment of the invention comprises a method of performing position location in a wireless subscriber unit having a local oscillator, including the steps of receiving a position location request, acquiring a timing signal when a sufficient period of time has elapsed since the local oscillator has been corrected and correcting said local oscillator using a correction signal based on said timing signal, substantially freezing the correction signal, performing a position location procedure using the local oscillator with the correction signal applied, and ending said position location procedure.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A novel and improved method and apparatus for performing position location in wireless communications system is described. The exemplary embodiment is described in the context of the digital cellular telephone system. While use within this context is advantageous, different embodiments of the invention may be incorporated in different environments or configurations. In general, the various systems described herein may be formed using software controlled processors, integrated circuits, or discreet logic, however, implementation in an integrated circuit is preferred. The data, instructions, commands, information, signals, symbols and chips that may be referenced throughout the application are advantageously represented by voltages, currents, electromagnetic waves, magnetic fields or particles, optical fields or particles, or a combination thereof. Additionally, the blocks shown in each block diagram may represent hardware or method steps.

Figure 1:
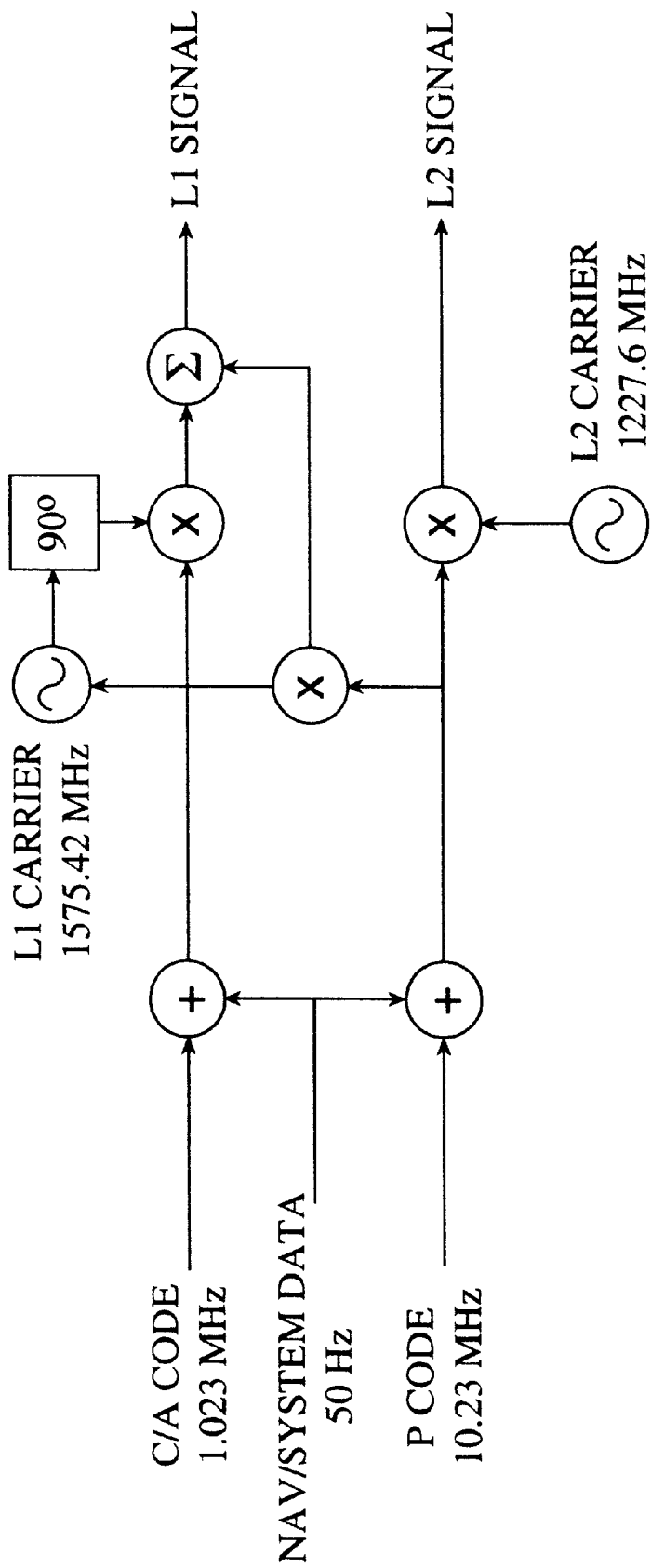
FIG. 1 is a block diagram of the Global Positioning System (GPS) waveform generator.

FIG. 1 is a block diagram of the Global Positioning System (GPS) waveform generator. The circle with a plus sign designates modulo-2 addition. In general, the GPS constellation consists of 24 satellites: 21 space vehicles (SVs) used for navigation and 3 spares. Each SV contains a clock that is synchronized to GPS time by monitoring ground stations. To determine a position and time, a GPS receiver processes the signals received from several satellites. At least 4 satellites must be used to solve for the 4 unknowns (x, y, z, time).

Each SV transmits 2 microwave carriers: the 1575.42 MHz L1 carrier, which carries the signals used for Standard Positioning Service (SPS), and the 1227.60 MHz L2 carrier, which carries signals needed for Precise Positioning Service (PPS). PPS is used by governmental agencies and allows a higher degree of accuracy in positioning.

The L1 carrier is modulated by the Coarse Acquisition (C/A) code, a 1023-chip pseudorandom code transmitted at 1.023 Mcps that is used for civil position location services. (The Coarse Acquisition code should not be confused with the coarse and fine acquisitions described herein, which both involve the use of the C/A codes.) Each satellite has its own C/A code that repeats every 1 ms. The P code, which is used for PPS, is a 10.23 MHz code that is 267 days in length. The P code appears on both carriers but is 90 degrees out of phase with the C/A code on the L1 carrier. The 50 Hz navigation message, which is exclusive-ORed with both the C/A code and P code before carrier modulation, provides system information such as satellite orbits and clock corrections.

The L1 carrier is modulated by the Coarse Acquisition (C/A) code, a 1023-chip pseudorandom code transmitted at 1.023 Mcps that is used for civil position location services.

Each satellite has its own C/A code that repeats every 1 ms. The P code, which is used for PPS, is a 10.23 MHz code that is 267 days in length. The P code appears on both carriers but is 90 degrees out of phase with the C/A code on the L1 carrier. The 50 Hz navigation message, which is exclusive-ORed with both the C/A code and P code before carrier modulation, provides system information such as satellite orbits and clock corrections.

The L1 carrier is modulated by the Coarse Acquisition (C/A) code, a 1023-chip pseudorandom code transmitted at 1.023 Mcps that is used for civil position location services. Each satellite has its own C/A code that repeats every 1 ms. The P code, which is used for PPS, is a 10.23 MHz code that is 267 days in length. The P code appears on both carriers but is 90 degrees out of phase with the C/A code on the L1 carrier. The 50 Hz navigation message, which is exclusive-ORed with both the C/A code and P code before carrier modulation, provides system information such as satellite orbits and clock corrections.

Each satellite has a different C/A code that belongs to a family of codes called Gold codes. Gold codes are used because the cross-correlation between them are small. The C/A code is generated using two 10-stage shift registers as shown below in FIG. 1. The G1 generator uses the polynomial $1+X^3+X^{10}$, while the G2 generator uses the polynomial $1+X^2+X^3+X^6+X^8+X^9+X^{10}$. The C/A code is generated by exclusive ORing the output of the G1 shift register with 2 bits of the G2 shift register.

Figure 2:
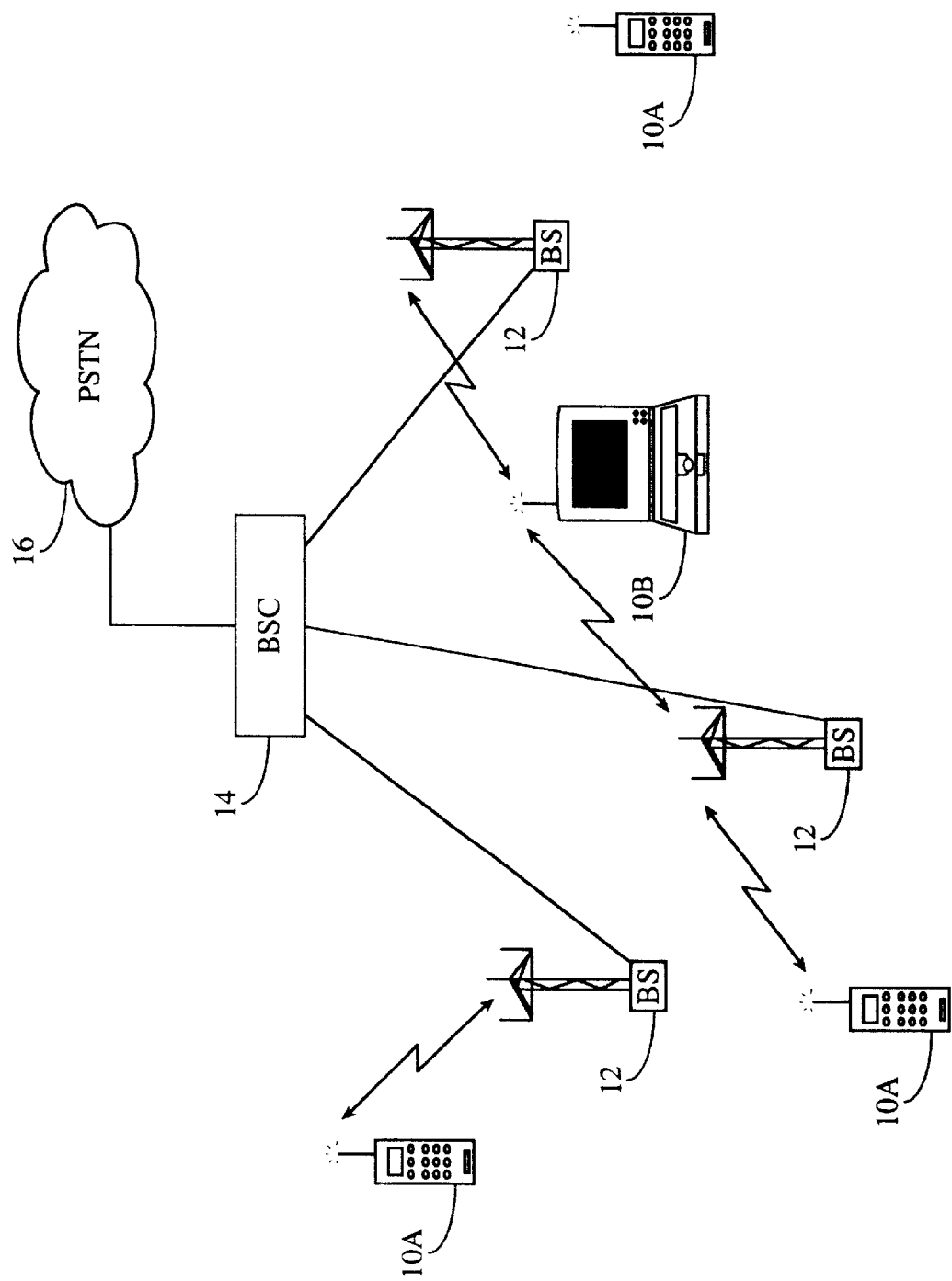
FIG. 2 is a highly simplified block diagram of a cellular telephone system configured in accordance with the use of present invention.

FIG. 2 is a highly simplified block diagram of a cellular telephone system configured in accordance with the use of present invention. Mobile telephones 10 are located among base stations 12, which are coupled to base station controller (BSC) 14. Mobile switching center MSC 16 connects BSC 14 to the public switch telephone network (PSTN). During operation, some mobile telephones are conducting telephone calls by interfacing with base stations 12 while others are in standby mode.

As described in copending U.S. patent application Ser. No. 09/040,051 entitled "SYSTEM AND METHOD FOR DETERMINING THE POSITION OF A WIRELESS CDMA TRANCEIVER" assigned to the assignee of the present invention and incorporated herein by reference, position location is facilitated by the transmission of a position request message containing "aiding information" that allows the mobile telephone to quickly acquire the GPS signal. This information includes the ID number of the SV (SV ID), the estimated code phase, the search window size around the estimate code phase, and the estimated frequency Doppler. Using this information, the mobile unit can acquire the GPS signals and determine its location more quickly.

In response to the aiding message, the mobile unit tunes to the GPS frequency and begins correlating the received signal with its locally generated C/A sequences for the SVs indicated by the base station. It uses the aiding information to narrow the search space and compensate for Doppler effects, and obtains pseudo-ranges for each satellite using time correlation. Note that these pseudo-ranges are based on mobile unit time (referenced from the CDMA receiver's combiner system time counter), which is a delayed version of GPS time.

Once this information is calculated, the mobile unit sends the pseudo-ranges for each satellite (preferably to ⅛ chip resolution) and the time the measurements were taken to the base station. The mobile unit then retunes to CDMA to continue the call.

Upon, receipt of the information, the BSC uses the one-way delay estimate to converts the pseudo-ranges from mobile unit time to base station time and computes the estimated position of the mobile unit by solving for the intersection of several spheres.

Another parameter provided by the aiding message is the frequency Doppler or Doppler offset. The Doppler effect manifests as an apparent change in the frequency of a received signal due to a relative velocity between the transmitter and receiver. The effect of the Doppler on the carrier is referred to as frequency Doppler, while the effect on the baseband signal is referred to as code Doppler.

In the GPS case, frequency Doppler changes the received carrier frequency so the effect is the same as demodulating with a carrier offset. Since the base station's GPS receiver is actively tracking the desired satellite, it knows the frequency Doppler due to satellite movement. Moreover, the satellite is so far away from the base station and the mobile unit that the Doppler seen by the mobile unit is effectively the same as the Doppler seen by the base station. In one embodiment of the invention, to correct for the frequency Doppler value, the mobile unit uses a rotator in the receiver. The frequency Doppler ranges from −4500 Hz to +4500 Hz, and the rate of change is on the order of 1 Hz/s.

The effect of the code Doppler is to change the 1.023 Mhz chip rate, which effectively compresses or expands the width of the received C/A code chips. In one embodiment of the invention, the mobile unit correct for code Doppler by multiplying the frequency Doppler by the ratio 1.023/1575.42. The mobile unit can then correct for code Doppler over time by slewing (introducing delay into) the phase of the received IQ samples in 1/16 chip increments as necessary.

Figure 3:
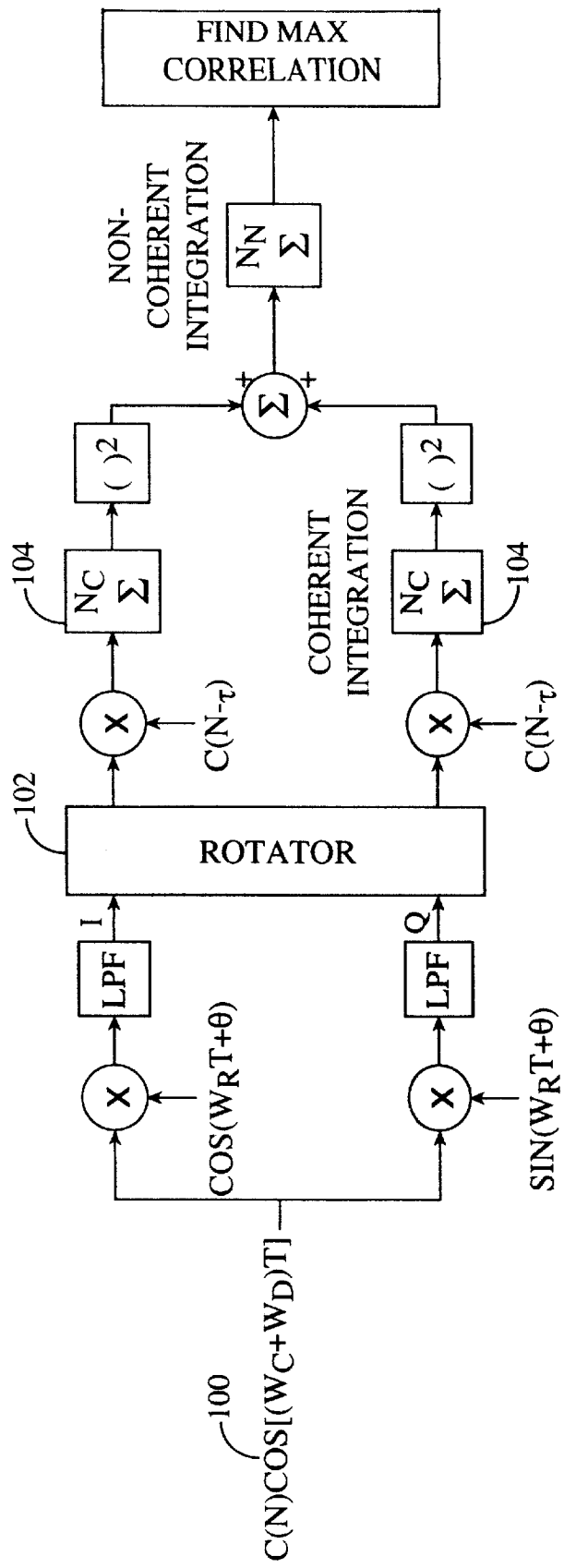
FIG. 3 is a block diagram of a receiver configured in accordance with one embodiment of the invention.

FIG. 3 is a block diagram of the receiver portion of a cellular telephone (wireless subscriber unit) configured in accordance with one embodiment of the invention. The received waveform 100 is modeled as the C/A signal c(n) modulated with a carrier at frequency $w_c+w_d$, where $w_c$ is the nominal carrier frequency 1575.42 MHz, and $w_d$ is the Doppler frequency created by satellite movement. The Doppler frequency ranges from 0 when the satellite is directly overhead, to about 4.5 kHz in the worst case. The receiver analog section can be modeled as demodulation with a carrier at frequency $w_r$ and random phase θ, followed by low pass filtering.

The resulting baseband signal is passed through an A/D converter (not shown) to produce digital I and Q samples, which are stored so that they may be repeatedly searched. The samples are generated at two times the C/A code chip rate (chip×2) which is a lower resolution than necessary to perform the fine search algorithm, but which allows 18 ms of sample data to be stored in a reasonable amount of memory. In general, it is desirable to perform the searching over something greater than 10 ms in order to allow acquisition in most environmental conditions, with 18 ms being a preferred integration period. These environmental conditions include being inside or not having a direct view to the satellite.

During operation, the samples are first rotated by rotator 102 to correct for the Doppler frequency offset. The rotated I and Q samples are correlated with various offsets of the satellite's C/A sequence and the resulting products are coherently integrated over Nc chips by integrators 104. The coherent integration sums are squared and added together to remove the effect of the unknown phase offset θ. To augment the hypothesis test for a particular offset, several coherent intervals are non-coherently combined. This despreading is performed repeatedly at various time offsets to find the time offset of the satellite signal. Rotator 102 removes the frequency Doppler created by satellite movement. It uses the Doppler frequency specified by the base station (preferably quantized to 10 Hz intervals) and rotates the I and Q samples to remove the frequency offset.

In one embodiment of the invention, the rotation is continuous only over the coherent integration window. That is, the rotator stops in between coherent integration periods of, for example, 1 ms. Any resulting phase difference is eliminated by the square and sum.

Figure 4:
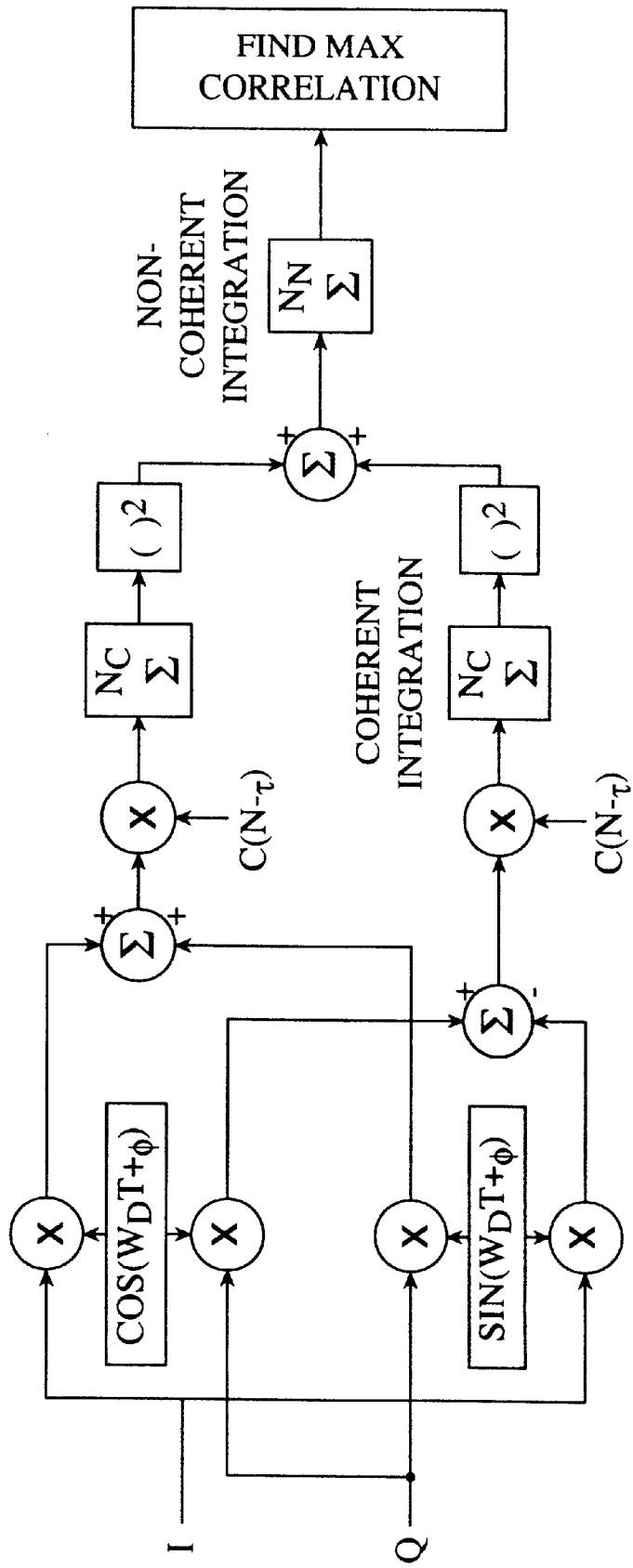
FIG. 4 is another block diagram of the receiver depicted in FIG. 3.

FIG. 4 is another block diagram of a receiver configured in accordance with one embodiment of the invention, where the rotator portion of the receiver is depicted in greater detail.

Figure 5:
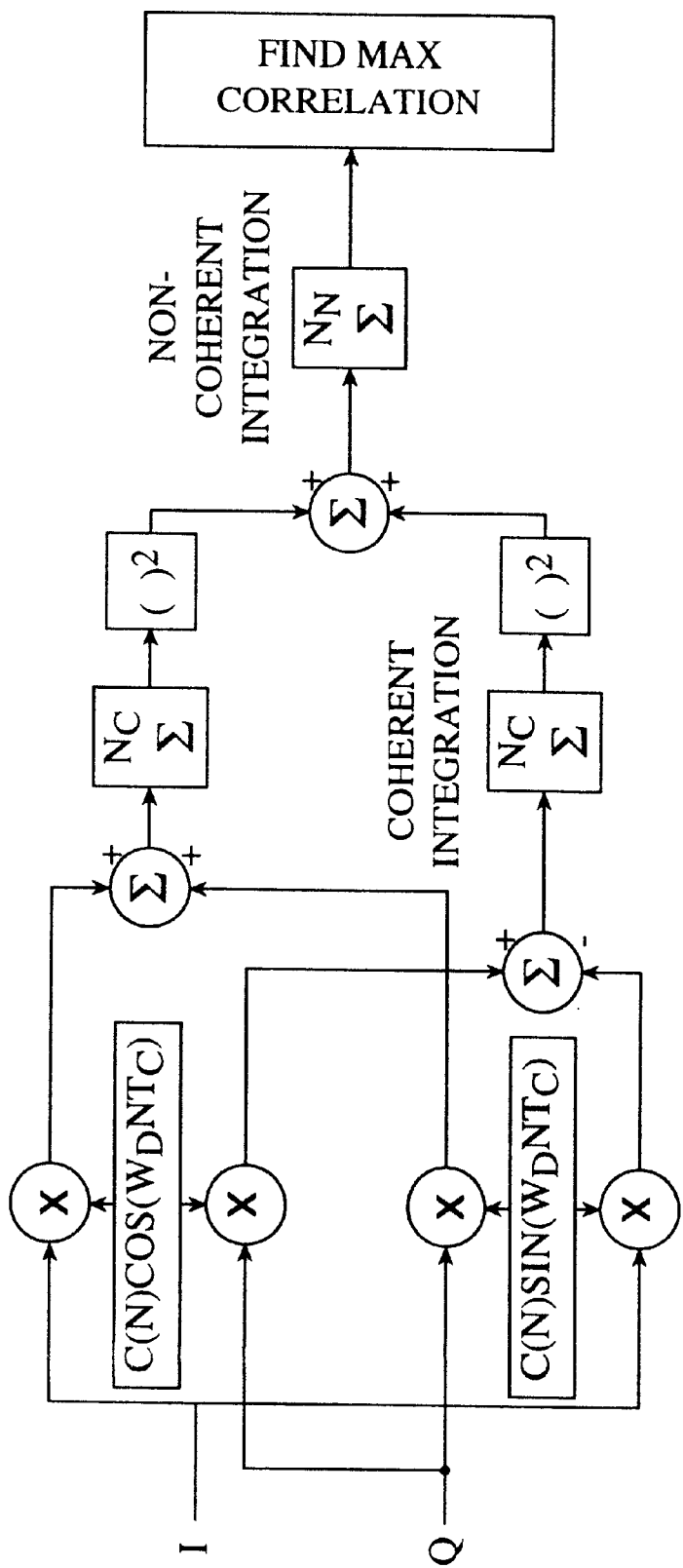
FIG. 5 is a receiver configured in accordance with an alternative embodiment of the invention.

FIG. 5 is a receiver configured in accordance with an alternative embodiment of the invention. This internal embodiment of the invention takes advantage of the ability to stop the rotator between coherent integration periods by rotating the locally generated C/A sequence instead of the input samples.

As shown, the C/A sequence c(n) are rotated by application to the sinusoids $\sin(W_d nT_c)$ and $\cos(W_d nT_c)$ and then stored. The rotation of the C/A sequence only needs to be done once for each satellite. Thus, rotating the C/A sequence reduces the amount of computation required. It also saves memory in the DSP used to perform this computation in one embodiment of the invention.

Another significant impairment that degrades the performance of the position location algorithm is the frequency error in the mobile units internal clock. It is this frequency error which drives the use of short coherent integration times on the order of 1 ms. It is preferable to perform coherent integration over longer time periods.

In an exemplary configurations, the mobile's free running (internal) local oscillator clock is a 19.68 MHz crystal that has a frequency tolerance of +/-5 ppm. This can cause large errors on the order of +/-7500 Hz. This clock is used to generate the carriers used for demodulation of the GPS signals, so the clock error will add to the signal acquisition time. Because the time available to search is very small, error of this magnitude due to the frequency tolerance are not tolerable and must be greatly reduced.

To allow longer coherent integration times, in one embodiment of the invention, the CDMA receiver corrects for local oscillator error by using timing acquired from the CDMA pilot, or any other source of timing information available, such as a signal from among a set of GSM downlink channels including, but not limited to, the assigned traffic channel mid-amble and/or GSM frequency correction control channel. This produces a control signal that is used to tune the local oscillator clock to 19.68 MHz as closely as possible. The control signal applied to the local oscillator clock is frozen when the RF unit switches from CDMA to GPS.

Even after the correction is performed using the timing information from the bases station (or other source), however, some additional clock error remains. In one embodiment of the invention, the resulting frequency uncertainty after correction is +/-100 Hz. This remaining error still reduces the performance of the receiver, and in general prevents longer coherent integration times. In one embodiment of the invention, the remaining error simply avoided by performing non-coherent integration for duration of more than 1 ms which reduces performance.

As also shown in FIG. 1, the 50 Hz NAV/system data is also modulated onto the L1 carrier. If a data transition (0 to 1 or 1 to 0) occurs between the two halves of a coherent integration window, the resulting coherent integration sum will be zero because the two halves will cancel each other out. This effectively reduces the number of non-coherent accumulations by one in the worst case. Although the data boundaries of all the satellites are synchronized, they do not arrive at the mobile unit simultaneously because of the differences in path delay. This path delay effectively randomizes the received data phase.

In one embodiment of the invention, the problem of different data phases on different signals is to include the data phase in the aiding information sent from the base station to the mobile unit. Since the base station is demodulating the 50 Hz data, it knows when the data transitions occur for each satellite. By using knowledge of the one-way delay, the base station can encode the data phase in, for example, 5 bits (per satellite) by indicating which one millisecond interval (out of 20) the data transition occurs on.

If the coherent integration window straddles the 50 Hz data boundary the coherent integration is divided into two (2) sections. One section preceding the data boundary and one section following the data boundary. For example, if En1 is the coherent integration sum over the window preceding the data boundary the first half of this window and En2 is the coherent integration sum over the window following the data boundary, the mobile unit then selects the maximum (in magnitude) of (En1+En2) (in case the data stayed the same) and (En1−En2) (in case the data changed) to account for the phase change. The mobile unit also has the option of performing non-coherent combining of the two halves over this data window or avoiding this data window completely.

In an alternative embodiment of the invention, the mobile unit attempts to find the data transitions without the aiding information from the base station by comparing the magnitude squared of the sum and difference in 1 ms coherent integration.

In one embodiment of the invention, a firmware-based DSP (Digital Signal Processor) approach is used to perform the GPS processing. The DSP receives I and Q samples at a chip×2 (2.046 MHz) or chip×8 (8.184 MHz) rate, and stores a snapshot of 4-bit I and Q samples in its internal RAM.

In the exemplary embodiment, the DSP generates the C/A sequence, performs rotation to eliminate frequency Doppler, and correlates over the search window provided by the base station for each of the satellites. The DSP performs coherent integration and non-coherent combining and slews an IQ sample decimator as necessary to compensate for code Doppler.

To save computation and memory, the initial search is performed using ½ chip resolution and a finer search to obtain ⅛ chip (higher) resolution is performed around the best index (or indexes). System time is maintained by counting hardware-generated 1 ms interrupts (derived from local oscillator).

Additionally, in one embodiment of the invention, the fine search is performed by accumulating the chip×8 samples (higher resolution) over the duration of one chip at various chip×8 offsets. The correlation codes are applied to the accumulated values yielding correlation values that vary with the particular chip×8 offset. This allows the code offset to be determined with chip×8 resolution.

Figure 6:
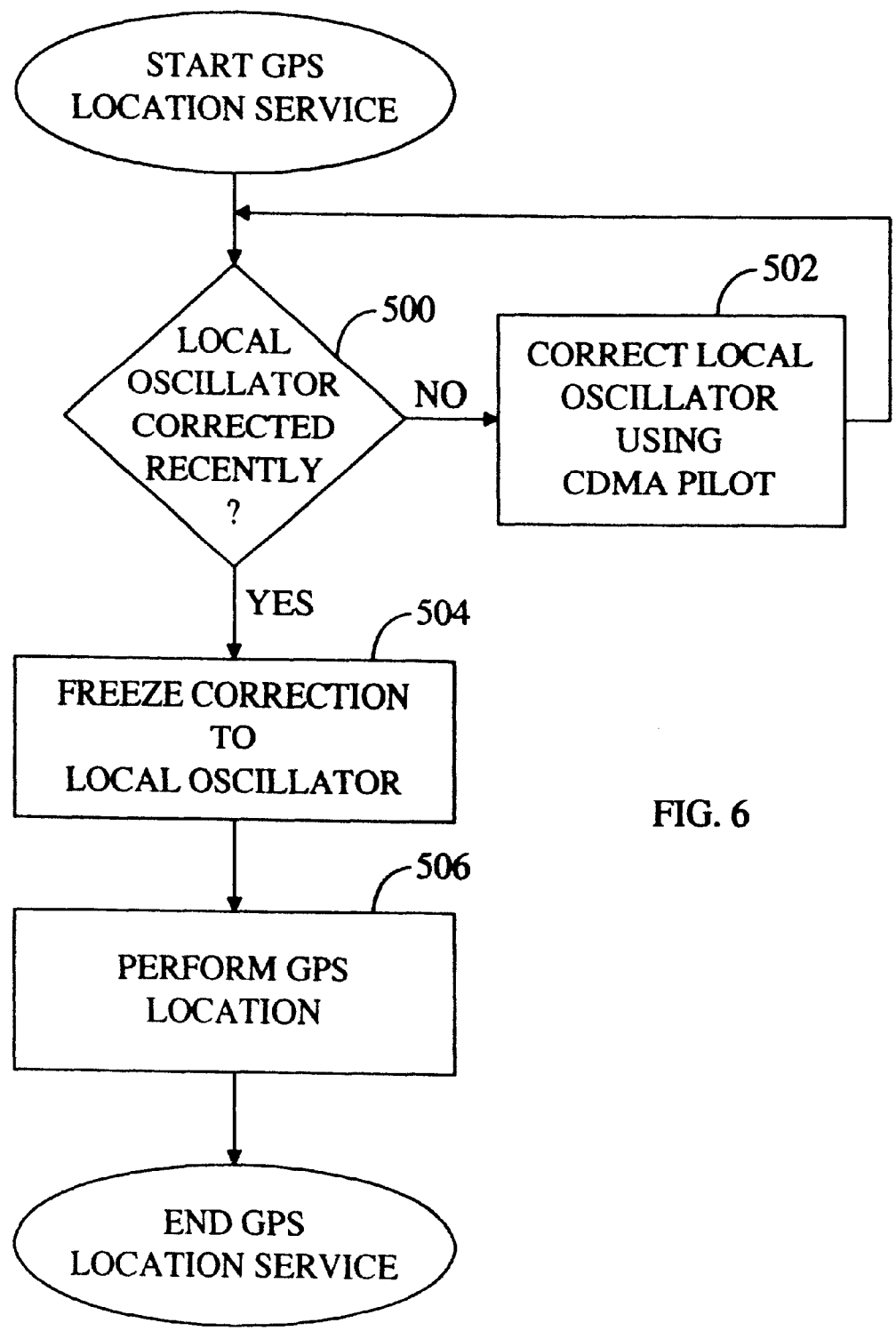
FIG. 6 is a flow chart of the steps performed during a position location operation.

FIG. 6 is a flow chart illustrating the steps performed to correct for the local oscillator error during a position location procedure when performed in accordance with one embodiment of the invention. At step 500, it is determined whether the local oscillator has been corrected recently. If not, then a timing signal is acquired from the base station, such as a pilot signal or a signal from among a set of GSM downlink channels including, but not limited to, the assigned traffic channel mid-amble and/or GSM frequency correction control channel. The error of the local oscillator is determined by comparing the timing signal at step 502 to the LO and a generating a correction signal based on that error.

The flow then leads to step 504, where the correction signal is frozen at the current value. At step 506, enters GPS mode and performs the position location using the corrected clock. Once the position location has been performed, the mobile unit leaves GPS mode at step 508.

Figure 7:
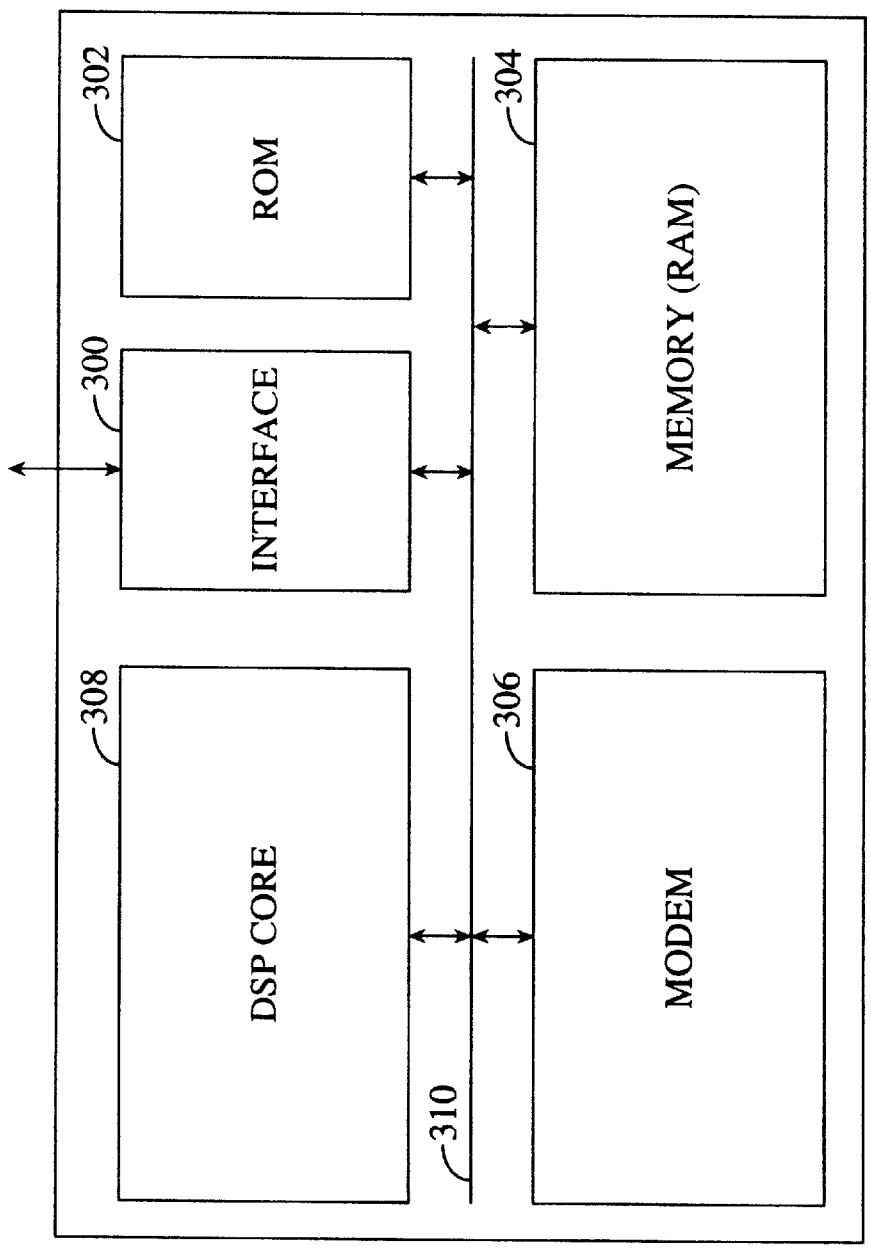
FIG. 7 is a block diagram of a DSP configured in accordance with one embodiment of the invention.

FIG. 7 is an illustration of a DSP receiver system configured in accordance with one embodiment of the invention. The DSP performs the entire searching operation with minimal additional hardware. DSP core 308, modem 306, interface unit 300, ROM 302 and Memory (RAM) 304 are coupled via bus 306. Interface unit 300 receives RF samples from an RF unit (not shown) and provides the samples to RAM 304. The RF samples can be stored at coarse resolution or fine resolution. The DSP core 308 processes the samples stored in memory using instruction stored in ROM 302 as well as in memory 304. Memory 304 may have multiple "banks" some of which store samples and some of which store instructions. Modem 700 performs CDMA processing during normal mode.

Figure 8:
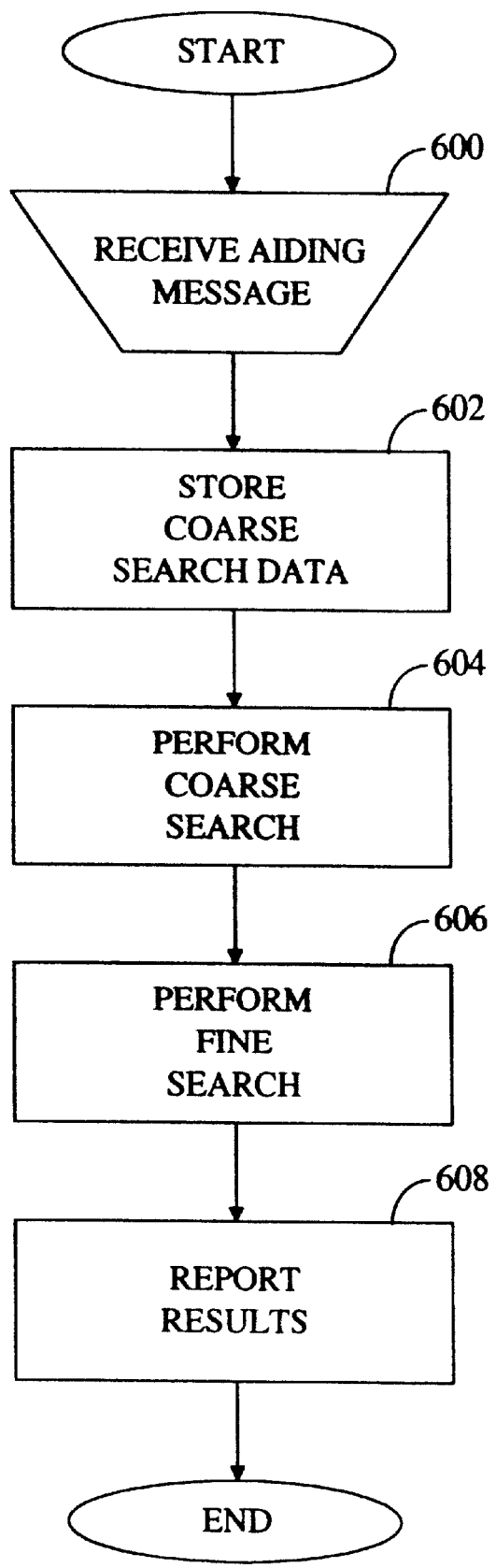
FIG. 8 is a flow chart illustrating the steps performed during a search performed in accordance with one embodiment of the invention.

FIG. 8 is a flow chart of the steps performed during a position location operation. A position location operation begins when the aiding messaging is received, and the RF systems is switched to GPS frequencies at step 600. When the RF is switched to receive GPS, the frequency tracking loop is fixed. The DSP receives aiding information from the phone microprocessor and sorts the satellites by Doppler magnitude.

At step 602, the coarse search data is stored within the DSP RAM. The DSP receives a few hundred microseconds of input data to set an Rx AGC. The DSP records the system time and begins storing an 18 ms window (DSP memory limitation) of chip×2 IQ data in its internal RAM. A contiguous window of data is used to mitigate the effects of code Doppler.

Once the data is stored, a coarse search is performed at step 604. The DSP begins the coarse (chip×2 resolution) search. For each satellite, the DSP generates the C/A code, rotates the code based on the frequency Doppler, and correlates over the search window specified by the base station, via repeated application of the C/A code to the stored coarse search data. Satellites are processed over the same 18 ms data window and the best chip×2 hypothesis that exceeds a threshold is obtained for each satellite. Although a 2 ms coherent integration time (with 9 non-coherent integrations) is used in one embodiment of the invention, longer coherent integration times can be used (for example 18 ms), although preferably where additional adjustments are made as described below.

Once the coarse search is performed, a fine search is conducted, at step 606. Before beginning the fine search, the DSP computes the rotated C/A code for each of the satellites. This allows the DSP to process the fine search in real-time. In performing the fine (chip×8 resolution) search, the satellites are processed one at a time over different data.

The DSP first slews the decimator to compensate for code Doppler for the given satellite(s). It also resets the Rx AGC value while waiting for the next 1 ms boundary before storing a 1 ms coherent integration window of chip×8 samples.

The DSP processes 5 contiguous chip×8 resolution hypotheses on this 1 ms coherent integration window, where the center hypothesis is the best hypothesis obtained in the coarse search. After processing the next 1 ms window, the results are combined coherently and this 2 ms sum is combined non-coherently for all Nn iterations.

This step (starting from stewing the decimator) is repeated on the same data for the next satellite until all the satellites have been processed. If the code Doppler for 2 satellites is similar in magnitude, it may be possible to process both satellites over the same data to reduce the number of required data sets. In the worst case, 8 sets of 2*Nn data windows of 1 ms are used for the fine search.

Finally, at step 608, the results are reported to the microprocessor and the vocoder process is restarted within the DSP so that the call can continue. The DSP reports pseudoranges to the microprocessor, which forwards them to the base station. After the microprocessor redownloads the vocoder program code into the DSP memory, the DSP clears its data memory and restarts the vocoder.

Figure 9:
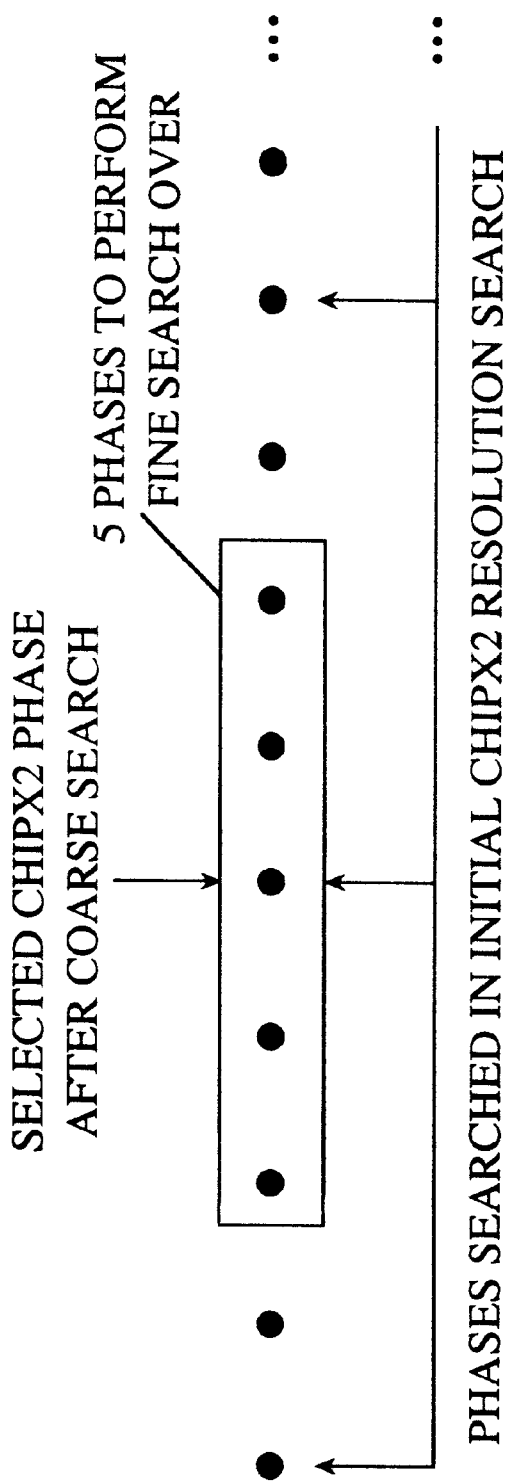
FIG. 9 is a time line illustrating the phases over which fine and coarse searches are performed in one embodiment of the invention.

FIG. 9 is a diagram illustrating the fine search performed after the coarse search. After isolating the best chip×2 phase in the coarse search, the DSP performs a fine search around this phase to gain chip×8 resolution.

The 5 phases to compare in the fine search are shown enclosed by a rectangle. The best chip×2 phase is evaluated again so that comparisons can be made over the same set of data. This also allows the coarse search and fine search to use different integration times. The fine search is performed separately for each satellite because each satellite may have a different value for code Doppler.

Figure 10:
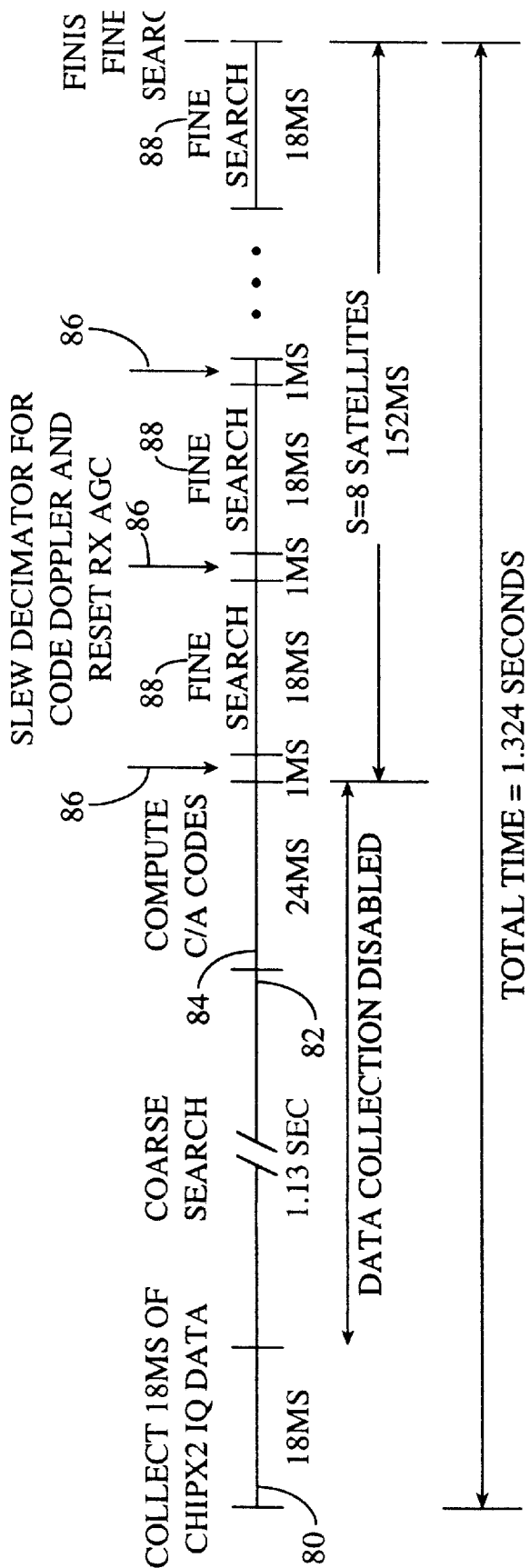
FIG. 10 is a time line of the search process when performed in accordance with one embodiment of the invention.
Figure 11:
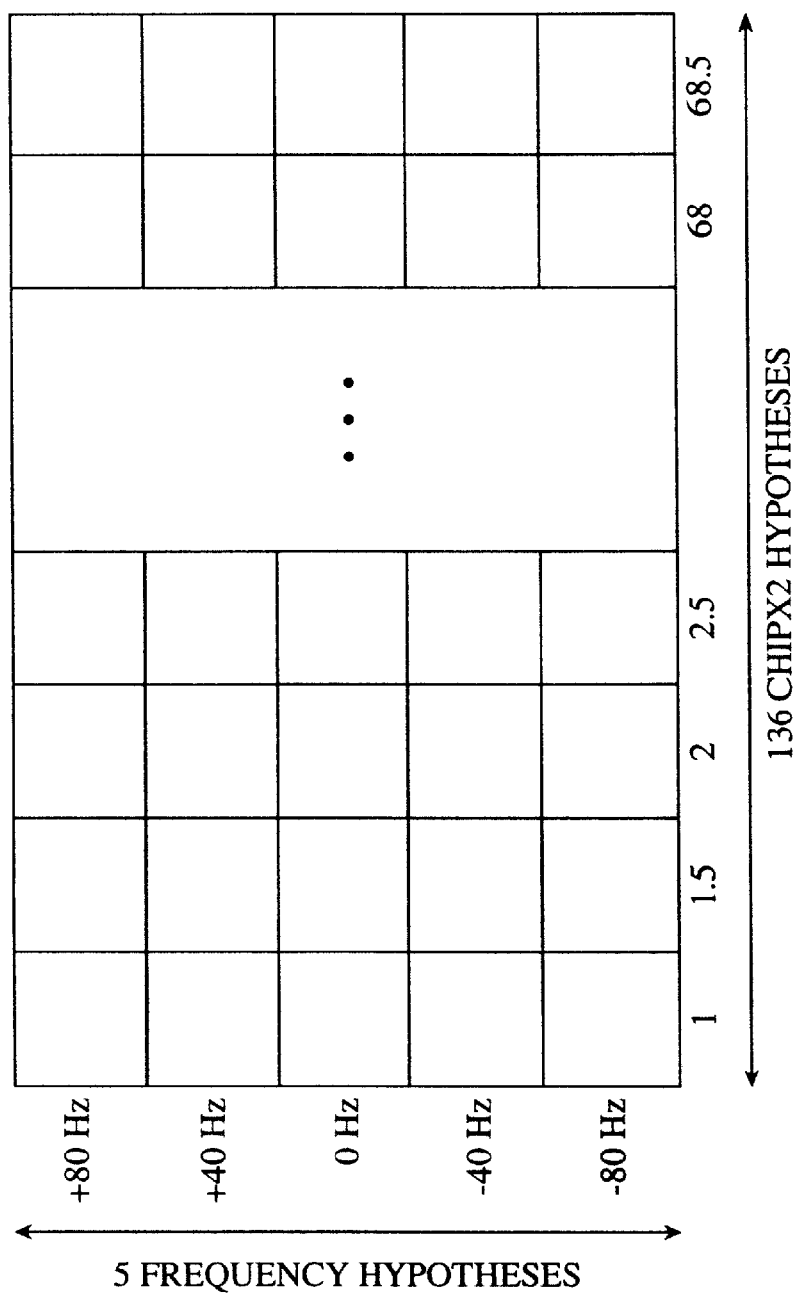
FIG. 11 is a diagram of search space.

FIG. 10 provides a time line of the search process when performed in accordance with one embodiment of the invention. The overall processing time (coarse+fine search) is performed in about 1.324 seconds in one embodiment of the invention, which does interrupt the call, but still allows the call to continue once the search is performed. The total search time of 1.324 seconds is an upper bound, because it assumes that the DSP needs to search all 8 satellites and each satellite has a search window of 68 chips. The probability that the entire 1.324 seconds will be necessary is small, however, due to the geometry of the satellite orbits.

During the first 18 ms 80, IQ sample data is collected at the GPS frequency. During the period 82, a coarse search is performed internally which could last up to 1.13 seconds, but which will probably terminate early when the satellite signals are identified. Once the coarse search is performed, the C/A codes are computed during time period 84, which takes 24 ms. During time periods 86 the slew value is adjusted for code Doppler and the Rx AGC is further adjusted. During time periods 88, fine searches are performed on the IQ data samples, with continuous adjustment performed during time periods 86. The use of 18 ms integration times allows code Doppler to be neglected because the received C/A code phase will be shifted by less than 1/16 of a chip. Up to eight sequences of adjustments and fine searches are performed for the up to eight satellites, at which time the position location procedure is complete.

Additionally, in some embodiments of the invention, the phone continues to transmit reverse link frames to the base station while the position location procedure is performed. These frames may contain null information simply to allow the base station to remain synchronized with the subscriber unit, or the frames may contain additional information such as power control commands or information request. The transmission of these frames is preferably performed when GPS samples are not being gathered when the RF circuitry is available, or while the GPS samples are gathered if sufficient RF circuitry is available.

Although the use of 18 ms integration time avoids the effects of code Doppler, the transmission of data over the GPS signals at 50 Hz rate can cause problems if a data change occurs within the 18 ms processing span (as described above). The data change causes the phase of the signal to shift. The 50 Hz data boundaries occur at different places for each satellite. The phase of the 50 Hz transitions for each satellite have been effectively randomized by the varying path lengths from each satellite to the phone.

In the worst case, if the data bit was inverted in the middle of a coherent integration interval, the coherent integration could be completely wiped out. For this reason, in an alternative embodiment of the invention, the base station must communicate the data transition boundaries for each satellite to the phone (also described above). Preferably, the data transmission boundary is also included in the aiding message transmitted from the base station (such as in a set of five bit messages indicating the millisecond interval during which the transition occurs for each satellite). The phone uses this boundary to split the coherent integration interval for each satellite into 2 pieces and decide whether to add or subtract the coherent integration sums in these 2 intervals. Thus, by also including the data boundary of each GPS signal, the reliability of the location procedure is increased.

In the exemplary embodiment of the invention, any frequency uncertainty creates a loss in Ec/Nt that increases with the coherent integration time. For example, uncertainty of +/−100 Hz, the loss in Ec/Nt increases rapidly as the coherent integration time is increased, as shown in Table I.

TABLE I

| Nc | Loss in Ec/Nt |
|---|---|
| 1023 (1 ms) | 0.14 dB |
| 2046 (2 ms) | 0.58 dB |
| 4092 (4 ms) | 2.42 dB |
| 6138 (6 ms) | 5.94 dB |
| 8184 (8 ms) | 12.6 dB |

As also noted above, there is always some unknown frequency offset of the local oscillator in the mobile unit. It is this unknown frequency offset that prevents longer coherent despreading and integration from being performed. Longer coherent would improve processing if the effects of the unknown frequency offset could be reduced.

In one embodiment of the invention, this unknown frequency offset is accounted for by expanding the search space to 2 dimensions to include frequency searches. For each hypothesis, several frequency searches are performed, where each frequency search assumes the frequency offset is a known value. By spacing the frequency offsets, one can reduce the frequency uncertainty to an arbitrarily small value at the expense of added computation and memory. For example, if 5 frequency hypotheses are used, the resulting search space is shown in FIG. 10.

For a +/−100 Hz frequency uncertainty, which is the typically operating specification of a mobile unit, this configuration reduces the maximum frequency offset to 20 Hz (one hypothesis must be within 20 Hz of the actual frequency offset). With a 20 ms coherent integration time, the loss in Ec/Nt with a 20 Hz frequency offset is 2.42 dB. By doubling the number of frequency hypotheses to 10, the frequency uncertainty can be reduced to 10 Hz, which causes an Ec/Nt loss of 0.58 dB. However, adding additional hypotheses widens the search space, which increases both the computation and memory requirements.

One embodiment of the invention computes the frequency hypothesis by lumping the frequency offset in with the frequency Doppler, and computing a new rotated PN code for each frequency hypothesis. However, this makes the number of frequency hypotheses a multiplicative factor in the total computation: 5 frequency hypotheses would mean 5 times as much computation.

Alternatively, since the frequency uncertainty is small compared to the frequency Doppler, the rotation phase can be considered to be constant over a 1 ms interval (8% of a period for an 80 Hz hypothesis) in another embodiment of the invention. Therefore, by dividing the coherent integration interval up into 1 ms subintervals, the integration sums of the subintervals are rotated to reduce the added computations needed to compute the frequency searches by three orders of magnitude. The result is that longer coherent despreading can be performed, and performance improved.

Figure 12:
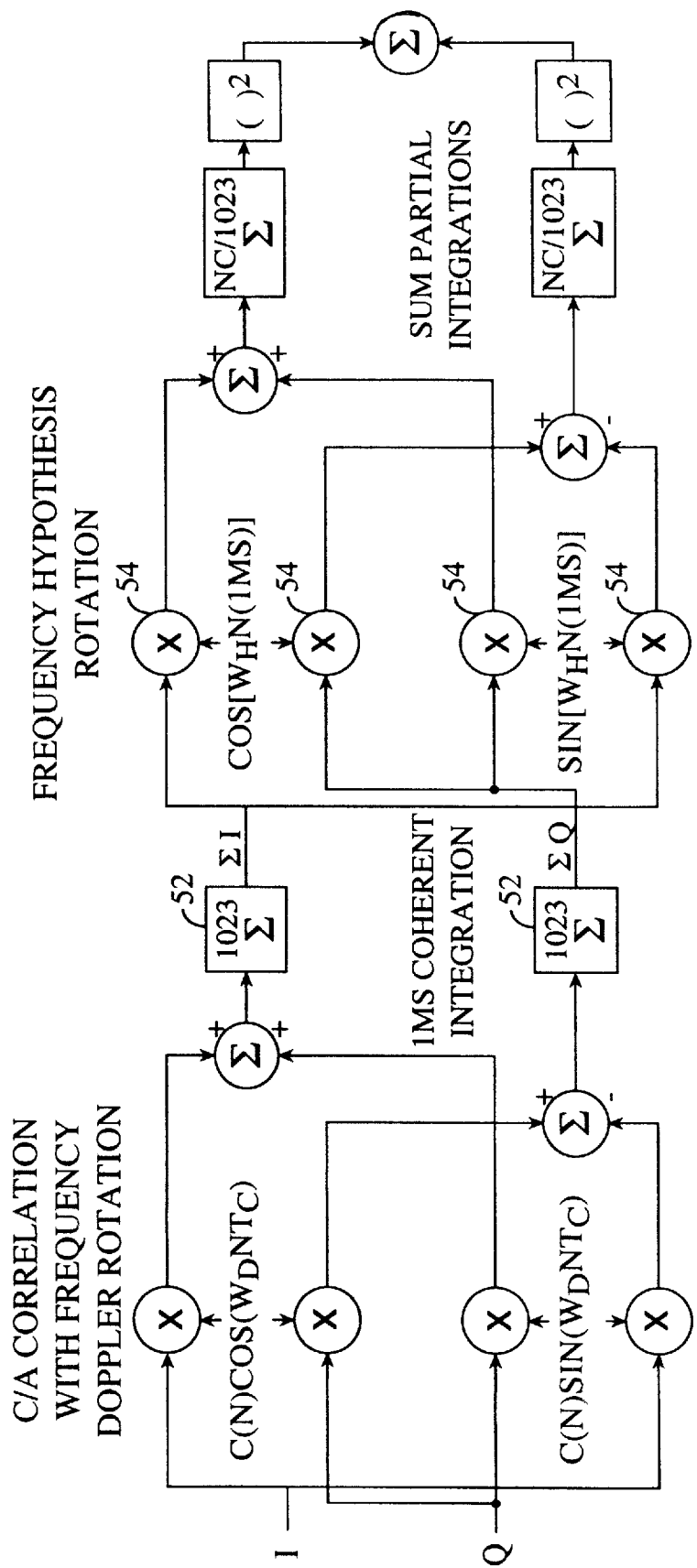
FIG. 12 is a block diagram of a receiver in accordance with another embodiment of the invention.

FIG. 12. is a block diagram of a receiver configured in accordance with the use of longer coherent despreading approach. The first set of multipliers 50 compensates for the frequency Doppler by correlating the IQ samples with a rotated C/A code. This is equivalent to rotating the IQ samples before correlation with the unmodified C/A code. Since the frequency Doppler can be as large as 4500 Hz, the rotation is applied to every chip. After coherently integrating over a 1 ms interval (1023 chips) using accumulators 52, the second set of multipliers 54 rotates the 1 ms integration sums ($\Sigma_I$ and $\Sigma_Q$) to implement the frequency hypothesis. The rotated sums are then added over the whole coherent integration interval.

Recall that the frequency Doppler rotation was only computed on 1023 chips to save memory and computation. For coherent integration times longer than 1 ms, each coherent integration sum are multiplied by a phase offset to make the phase of the rotation continuous over time. To show this mathematically, the 1 ms coherent integration sum with frequency Doppler rotation can be expressed as:

$$S_1 = \sum_{n=1}^{1023} [I(n) + jQ(n)]c(n)e^{-jw_d nT_c}$$

$$\text{with } \sum_I = \text{Re}\{S_1\} \text{ and } \sum_Q = \text{Im}\{S_1\}$$

where I(n) and Q(n) are the input samples received on the I and Q channels respectively, c(n) is the unrotated C/A code, $w_d$ is the frequency Doppler, and $T_c$ is the chip interval (0.9775 us). A 2 ms coherent integration sum can be expressed as:

$$S(2 \text{ ms}) = \sum_{n=1}^{2046} [I(n) + jQ(n)]c(n)e^{-jw_d nT_c}$$

$$= \sum_{n=1}^{1023} [I(n) + jQ(n)]c(n)e^{-jw_d nT_c} +$$

$$e^{-jw_d(1023)T_c} \sum_{n=1}^{1023} [I(n+1023) + jQ(n+1023)]c(n)e^{-jw_d nT_c}$$

$$= S_1 + e^{-jw_d(1023)T_c} S_2$$

Here, $S_1$ is the first 1 ms integration sum and $S_2$ is the second 1 ms integration sum computed using the same rotated C/A values that were used to compute $S_1$. The term $e^{-jw_d(1023)T_c}$ is the phase offset that compensates for using the same rotated values. Similarly, a 3 ms coherent integration sum can be expressed as $$S(3 \text{ ms}) = S_1 + e^{-jw_d(1023)T_c}S_2 + e^{-jw_d(2046)T_c}S_3$$

So to extend the integration time while using the same 1023-element rotated C/A sequence, the (n+1) 1 ms integration sum should be multiplied by $e^{-jw_d n(1ms)}$ before being added to the whole sum. Since this is a rotation of 1 ms integration sums, we can combine this operation with the frequency search to avoid having to perform 2 rotations. That is, since $$e^{-jw_d n(1ms)} e^{-jw_h n(1ms)} = e^{-j(w_d+w_h)n(1ms)}$$

we can multiply the (n+1)th 1 ms integration sum by $e^{-j(w_d+w_h)n(1ms)}$ to search a frequency hypothesis and account for the frequency Doppler phase offset.

Note that the frequency search can be reduced after acquiring one satellite, because the frequency uncertainty is not dependent on the satellite. A much finer frequency search can be performed if a longer coherent integration is desired.

In the exemplary embodiment of the invention, the fine search is performed in similar manner the coarse search with 2 differences. First, the integration intervals are always added coherently instead of squaring and adding noncoherently. Second, the rotation to remove the frequency uncertainty (which should be known after the coarse search) is combined with the frequency Doppler phase offset and used to rotate the 1 ms coherent integration intervals before adding them together.

In an alternative embodiment of the invention, the coherent integration window of chipx2 data is integrated for integration times longer than 18 ms. This embodiment is useful were additional memory is available. For coherent integrations longer than 18 ms, the 50 Hz data boundaries are treated the same as with shorter integration periods. The base station indicates where the boundaries are for each satellite and the DSP decides whether to add or subtract the sum of 20 1 ms coherent integration intervals to or from its running sum.

However, because the product of the frequency uncertainty and the integration time constant affects the loss in Ec/Nt, the frequency uncertainty must be reduced to very small levels for long coherent integration intervals. Since a 20 ms integration with a 20 Hz frequency uncertainty resulted in a loss in Ec/Nt of 2.42 dB, maintaining the same loss with an integration time of 400 ms requires that the frequency uncertainty be reduced to 1 Hz. To correct for this problem, the frequency uncertainty is reduced down to 1 Hz in a hierarchical manner. For example, a first frequency search reduces the uncertainty from 100 Hz to 20 Hz, a second search reduces the uncertainty to 4 Hz, and a third search reduces the uncertainty to 1 Hz. The frequency search will also compensate for errors in the frequency Doppler obtained from the base station.

Additionally, to perform longer integrations only satellites with similar Doppler are searched over the same data for long integration times, since the code Doppler is different for each satellite. The DSP computes how long it takes to slip 1/16 of a chip and slews the decimator as it collects a coherent integration data window. Additionally, multiple data windows are taken in this embodiment.

Thus, a method and apparatus for performing position location in wireless communications system has been described. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method of performing position location in a wireless subscriber unit having a local oscillator, comprising the steps of:

receiving a position location request;

acquiring a timing signal a period of time after the local oscillator had been corrected and correcting said local oscillator using a correction signal based on said timing signal, substantially freezing the correction signal;

performing a position location procedure using the local oscillator with the correction signal applied; and ending the position location procedure, wherein said timing signal is a signal from among a set of GSM downlink channels of a GSM wireless communication system.

2. The method of claim 1, wherein the set of GSM downlink channels includes an assigned traffic channel mid-amble.

3. The method of claim 2, wherein the set of GSM downlink channels further includes a GSM frequency correction control channel.

4. The method of claim 1, wherein the set of GSM downlink channels includes a GSM frequency correction control channel.

* * * * *